(12) United States Patent
Han (10) Patent No.: US 7,096,122 B2
(45) Date of Patent: Aug. 22, 2006

(54) METHOD FOR PRODUCING FULL FIELD RADIAL GRID FOR HYDROCARBON RESERVOIR SIMULATION

(76) Inventor: Dianli Han, 22939 Emily Trace Ln., Katy, TX (US) 77494

( * ) Notice: Subject to any disclaimer, the term of this patent is extended or adjusted under 35 U.S.C. 154(b) by 194 days.

(21) Appl. No.: 10/897,150

(22) Filed: Jul. 21, 2004

(65) Prior Publication Data

US 2005/0021234 A1 Jan. 27, 2005

Related U.S. Application Data

(60) Provisional application No. 60/489,241, filed on Jul. 22, 2003.

(51) Int. Cl.
*G01N 15/08* (2006.01)
*G06G 7/48* (2006.01)

(52) U.S. Cl. .......................... 702/13; 703/10
(58) Field of Classification Search ................ 702/13, 702/11, 5; 367/72, 73; 703/10; 345/440

See application file for complete search history.

(56) References Cited

U.S. PATENT DOCUMENTS

| | | | |
|---|---|---|---|
| 4,991,095 A | | 2/1991 | Swanson |
| 5,740,342 A | * | 4/1998 | Kocberber ............... 345/420 |
| 5,844,564 A | * | 12/1998 | Bennis et al. ............. 345/423 |
| 6,018,497 A | * | 1/2000 | Gunasekera ............... 367/72 |
| 6,041,017 A | * | 3/2000 | Goldsberry ............... 367/38 |
| 6,078,869 A | * | 6/2000 | Gunasekera ............... 702/6 |
| 6,166,561 A | * | 12/2000 | Fifield et al. .............. 326/57 |
| 6,826,520 B1 | * | 11/2004 | Khan et al. ............... 703/10 |
| 6,907,392 B1 | * | 6/2005 | Bennis et al. ............. 703/10 |
| 6,928,399 B1 | * | 8/2005 | Watts et al. .............. 703/2 |
| 2002/0038201 A1 | | 3/2002 | Balaven et al. | |

OTHER PUBLICATIONS

Pedrosa Jr. et al., Use of a Hybrid Grid in reservoir Simulation, Nov. 1986, SPE Reservoir Engineering, pp. 611-621.*
Khalid Aziz, *Reservoir Simulation Grids: Opportunities and Problems*, Society of Petroleum Engineers, Inc., 12th SPE Symposium on Reservoir Simulation, held in New Orleans, LA, U.S.A., Feb. 28-Mar. 3, 1993.
*Reservoir Simulation Overview* http://22.spe.org/spe/cda/views/jpt/jptMaster/0,1513,1648_2300_2474276_0,000.html Apr. 22, 2003.
*The Windowing Technique* http://pangea.Stanford.edu/~mmlacnik/Research.htm May 18, 2004.

* cited by examiner

*Primary Examiner*—Michael Nghiem
*Assistant Examiner*—Toan M. Le
(74) *Attorney, Agent, or Firm*—Gary L. Bush, Esq.; Andrews Kurth LLP (57) ABSTRACT

A method producing full field radial grid includes both aerial and vertical gridding to divide a reservoir structure into simulation grid cells. The aerial gridding is performed by 1) specifying a reservoir boundary (including faults) and well locations; 2) distributing a set of concentric circles around each well location; 3) determining the circle-circle and circle-boundary intersection locations of these circles; 4) forming the aerial grid by selecting circles, arc segments of intersecting circles and radial lines which connect the ends of these arc segments to the corresponding well center; 5) and forming additional grid lines by selecting the connecting lines of two wells if their circles intersect, adding additional radial lines to certain wells, and connecting end points of certain selected arc segments. The vertical gridding is performed by casting the aerial grid vertically downwardly through all the layers defined in the reservoir structure.

26 Claims, 9 Drawing Sheets

METHOD FOR PRODUCING FULL FIELD RADIAL GRID FOR HYDROCARBON RESERVOIR SIMULATION

CROSS REFERENCE

This application claims priority from previous application 60/489,241 filed on Jul. 22, 2003.

BACKGROUND OF THE INVENTION

1. Field of Invention

This invention relates generally to the field of reservoir engineering and analysis. In particular the invention concerns creating a numerical model or simulation of a subterranean oil and gas reservoir. Still more particularly, the invention is for a method and apparatus for creating an areal grid within a reservoir boundary area for creating reservoir cells the shapes of which are defined in the areal grid projected vertically downwardly into the earth and by layering boundaries.

2. Description of Prior Art

A reservoir model is used by petroleum engineers to predict reservoir performance by numerically solving flow equations which describe fluid flow in petroleum reservoirs during the oil and gas recovery process. By using the model, various reservoir recovery plans can be simulated in order to find the one which best meets the reservoir recovery objectives.

In the petroleum industry, reservoir simulation has been primarily conducted by dedicated specialists. There is a trend within the industry to make reservoir simulation a tool for day-to-day use by members of asset teams. However, prior art simulators are too complex for the non-expert users.

To create a model of the reservoir, simulation engineers first divide an areal surface into grid cells which are used to define grid blocks by layers of the grid cells extending into the reservoir structure. A numerical model is created by choosing a grid orientation, number and distribution of grid lines. Then wells are assigned to grid cells based on their locations. There can be millions of grid cells and hundreds of production and injection wells in a simulation model. For any change with the grid, well number and well locations, engineers must make changes to the cells to account for changes in the number and location of the wells, etc.: a very tedious process.

Besides the difficulties in setting up a numerical reservoir model, a simulation engineer also is concerned with the quality of the simulation grid and model. A desired grid should provide high numerical resolution in the reservoir regions where the simulated reservoir rock and fluid properties change rapidly with time and space. To this end, great efforts have been made in developing the local grid refinement technology in the past decades. One method has included replacing the coarse Cartesian grid with a fine Cartesian, radial or PEBI grid around the wellbores. (A PEBI grid is a Perpendicular Bisection grid, also known as a Voronoi grid of Voronoi blocks. A Voronoi block is defined as the region of space that is closer to its gridpoint than any other gridpoint. A consequence of this is that a line joining gridpoints of any two connected gridpoints is perpendicular to the gridblock boundary between these two gridpoints and its is bisected in two equal parts by that boundary.) Generally speaking, a radial grid defined model performs better for local grid refinement than a PEBI and Cartesian grid for local grid refinement. The radial grid has long been used for near wellbore precision modeling and single well reservoir modeling, because it can better describe the fluid flow process in reservoirs. However, no such radial gridding methods are known for multiple well simulation problems.

Another consideration for reservoir simulation grids is the reservoir boundary and faults conformance problem. Almost all the reservoirs are irregularly shaped and may have one or more faults. A prior solution involves removing coarse Cartesian grid cells in the concerned regions, replacing them with fine structured or non-structured grid cells, and smoothing out the transition from frame Cartesian cells to these special grid cells. Such a process introduces a great many extra grid cells. As far as the simulation accuracy concerns, it is only necessary to know the locations of the reservoir boundary and irregularities (including faults and pinch-outs). There is no dramatic physical properties change happening at such locations. In other words fine or special grid cells are not necessary for describing the reservoir shape.

IDENTIFICATION OF OBJECTS OF THE INVENTION

A primary object of the present invention is to develop a new method for creating a grid in order to make the reservoir simulation work flow easier for engineers. From the stand point of a reservoir simulation engineer, as soon as the reservoir geometry and existing and prospective well locations are known or assumed, there should be a model of the reservoir that corresponds closely to actual hydrocarbon production. A reservoir engineer desires such a result with as little involvement as possible with the mathematical side of reservoir simulation such as gridding the reservoir and assigning wells to grid cells. Accordingly, another object of the invention is to provide a gridding method where a user needs only one click on the well location to add a well. If needed, the well can be dragged around to other locations. When this is done, the grid will be automatically generated for the simulation problem.

Another primary object of the invention is to provide a method to automatically generate the simulation grid for the reservoir model based on reservoir geometry and well locations. Thus, an engineer can concentrate on the planning of the reservoir recovery process, instead of creating grids and moving wells from grid cells to grid cells.

It is another object aspect of the invention to create a field scale radial grid (called hereinafter a "Radial-X Grid") for simulating a reservoir with multiple wells. A radial grid has smaller grid cells near the wellbore and larger cells further away from the wellbore. It does not have the "grid orientation effect" which troubles the Cartesian grid and can achieve a desired simulation accuracy with much fewer grid cells compared to a Cartesian grid.

Another object of the invention to accurately describe the boundary shape and reservoir faults in the grid for the reservoir model. The locations of faults and reservoir boundary determine the drainage area that a well controls. The sustainability of the well production can not be reasonably predicted if the grid does not reasonably delineate the boundary and fault locations.

SUMMARY OF INVENTION

The objects of the invention as well as other features and advantages are incorporated in a method for gridding an areal space defining a boundary of a geologic reservoir structure. A well point is placed in the area corresponding to a wellbore. A plurality of concentric circles centered at the well point are distributed about the well point. The location of intersection points of the circles and the outer boundary is established. A trial radial line from the well point to each of the intersection points is made. A final radial line is found by determining an angle between each pair of adjacent trial radial lines, eliminating one trial radial line of each point where the angle is smaller than a predetermined angle, or adding a new trial radial line between each pair where the angle is greater than a predetermined maximum angle. By this process, the area within the outer boundary is divided into a grid of cells.

If multiple wells points are placed within the area, then beginning with a first well point, the method continues by identifying intersection circles of the set of circles centered about the first well point. An intersection circle is defined as the first outer radius circle about a well point that intersects either the outer boundary or a circle of a set of circles placed about other well points. Intersection points are found with the outer boundary and any circle about any other well point. A concentric circle is recorded as a final circle if it is not identified as an intersection circle. The locations of intersection points of the first intersection circle with the outer boundary are established, and trial radial lines are drawn according to the method discussed above for a single well model. Next, the location of circle-to-circle intersection points of the first intersection circle with one or more circles around another well point are formed. Arc segments of intersection circles which are not within another circle and not outside the outer boundary are recorded. Additional grid radial lines from the first well point to the ends of those recorded arc segments are established. The steps are repeated for each well point. Finally a well line is established between the center of a well point to the center of another well point only if (1) the well line does not create an angle which is smaller than a predetermined minimum angle with an adjacent one of the established grid radial lines, (2) the well line would not cross an established grid radial line, (3) the well line would not cross any selected arcs about a third well, and (4) the well line would not cross any existing well line, and (5) the steps (1) through (4) are repeated until all pairs of well points have been tested.

DESCRIPTION OF THE PREFERRED EMBODIMENT

Simulation Grid for Single Well Reservoir

Figure 1:
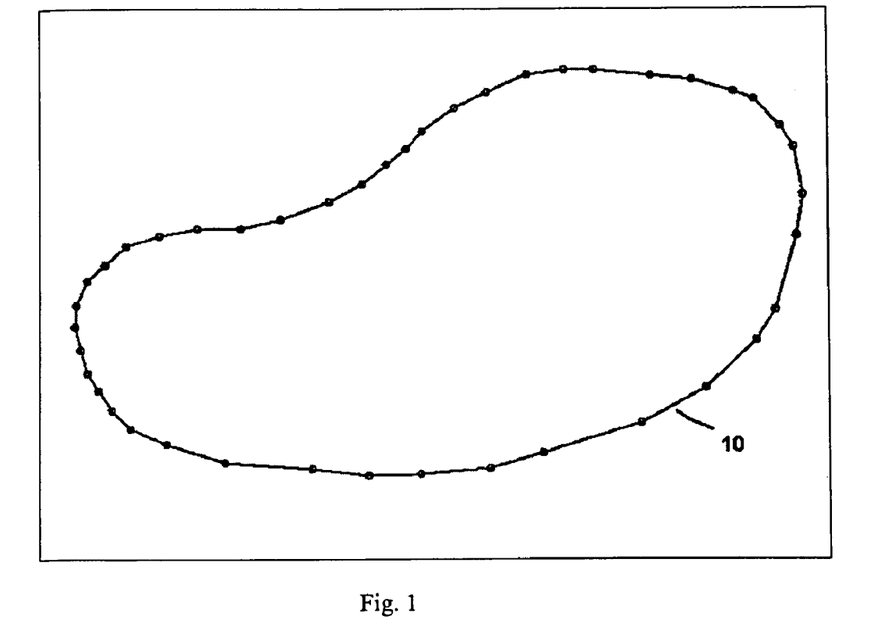
FIG. 1 shows a schematic of a lateral reservoir boundary; if needed, the reservoir boundary can be modified by mouse clicking and dragging the boundary points and by stretching boundary segments.

FIG. 1 is a top view of a schematic reservoir boundary 10. A reservoir boundary 10 can be created by digitizing paper maps or by exporting contours from a number of geological mapping programs. The boundary 10 can be presented by a reservoir modeling program and displayed on a computer monitor. The reservoir boundary 10 should cover oil and gas accumulative subterranean formations of interest and the surrounding aquifers. If the influence of aquifers is sufficiently considered in the reservoir map, the effect of the fluid exchanges between the enclosed reservoir and the outside regions is not significant to the predicted reservoir and well behaviors, and the reservoir boundary can be considered as impermeable. With the reservoir modeling according to the gridding of this invention, it is assumed that there is no fluid flow into and out of the reservoir boundary.

Figure 2:
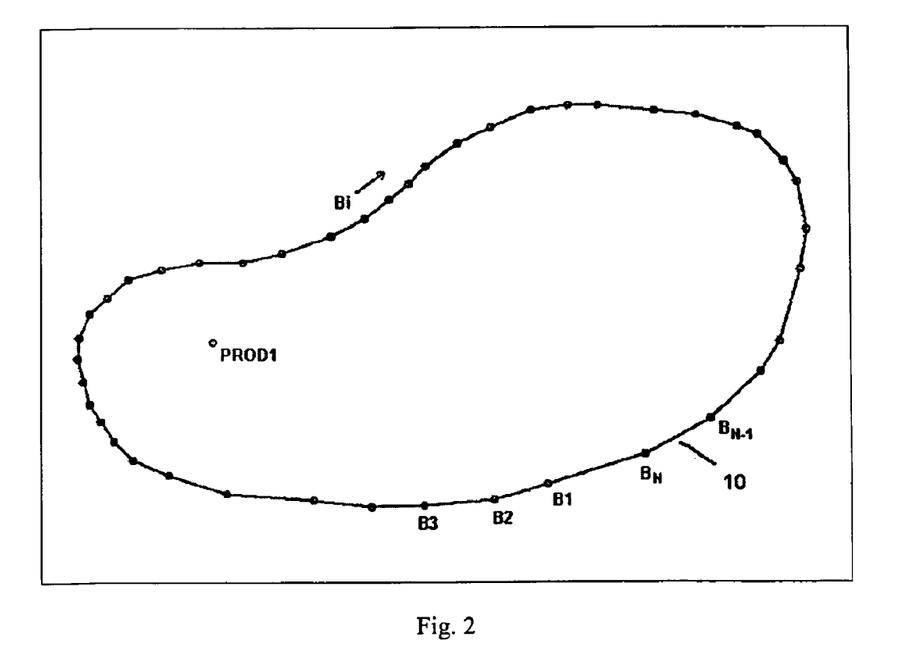
FIG. 2 illustrates that one vertical well has been added into the reservoir.

FIG. 2 shows a production well PROD1 that is placed within the reservoir boundary 10. The boundary 10 is displayed on a work station screen. Boundary points B1, B2, B3, ... $B_N$ are specified. Wells can be added by clicking with a computer mouse device at a location on the map on the screen, or imported from other geological mapping programs. A well PROD 1 can be moved to a new location by clicking and dragging the well to a new location by using an interactive device such as a computer mouse. The process of setting up wells in a reservoir model can thus be easily done by a simulation engineer while using the modeling software according to the invention.

Figure 3:
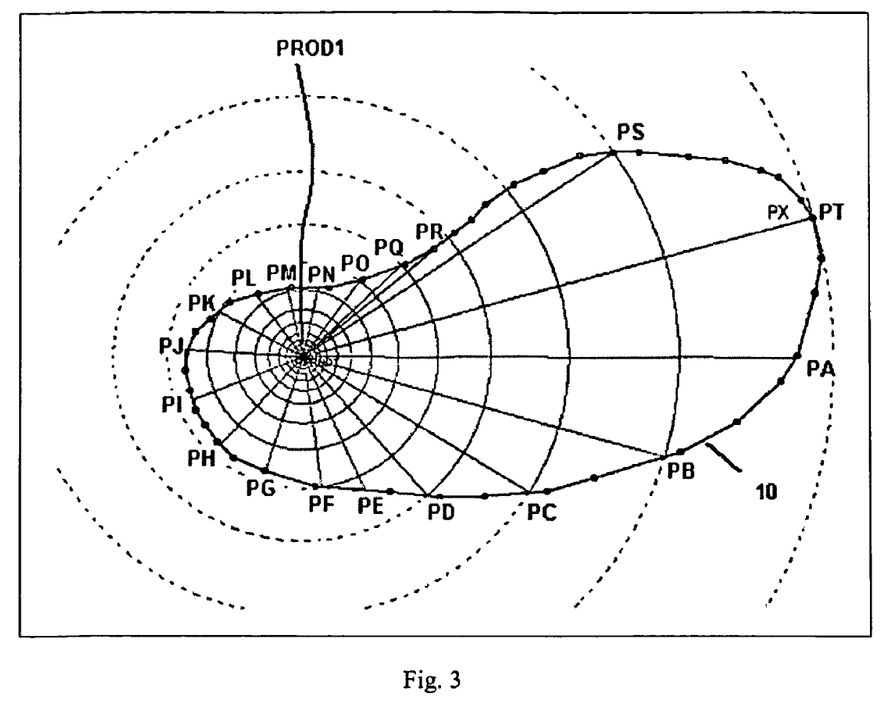
FIG. 3 shows an areal grid generated for the single well reservoir shown in FIG. 2 by placing thirty one circles around the wellbore where the grid is bound by the reservoir boundary.

FIG. 3 shows an areal grid embodiment of the invention for the reservoir boundary 10 shown in FIG. 2. The grid is constructed by the following steps:

1) A number of concentric circles are first distributed around the well center. The radii of these circles can be increased by a mathematical formula (i.e., in a geometric progression) or provided by the user;
2) Calculate the intersections of these circles with the reservoir boundary, e.g., points PB, PC ... PT as shown in FIG. 3;
3) Link each of the intersection points PB, PC ... PT with a radial line.

The following five parameters can be adjusted to create a desired grid by the gridding software according to the invention:

1) Circle Number. The circle number is a parameter provided by the user to specify the number of circles distributed around the well center. The radius of the first circle is set to be equal to the wellbore radius.
2) Minimum Angle. The minimum angle parameter is specified as to the minimum angle allowed between two adjacent radii. If the angle between two adjacent radii is smaller than this number, one of the radii will be removed.

3) Maximum Angle. The maximum angle parameter is specified as to the maximum angle allowed between two adjacent radii. If the angle between two adjacent radii is larger than the specified maximum angle, one or more radii will be added, e.g. the radius associated with point PA (where there is no intersection of a circle with the boundary between points PT and PB) is added for this purpose as shown in FIG. 3.

4) Re multiplier. The parameter Re is an initially estimated value for the radius of the largest circle. See FIG. 3. A method for Re estimation is described below for multiple wells. The actual radius Ra of the largest or outmost circle used for gridding is the product of Re and Re multiplier. (Ra=Re·Re multiplier). By varying the Re multiplier, the grid coverage on the reservoir can be adjusted.

5) Layer Number. The layer number is an input parameter which determines the number of layers provided in the reservoir model where vertical gridding is employed.

Figure 4:
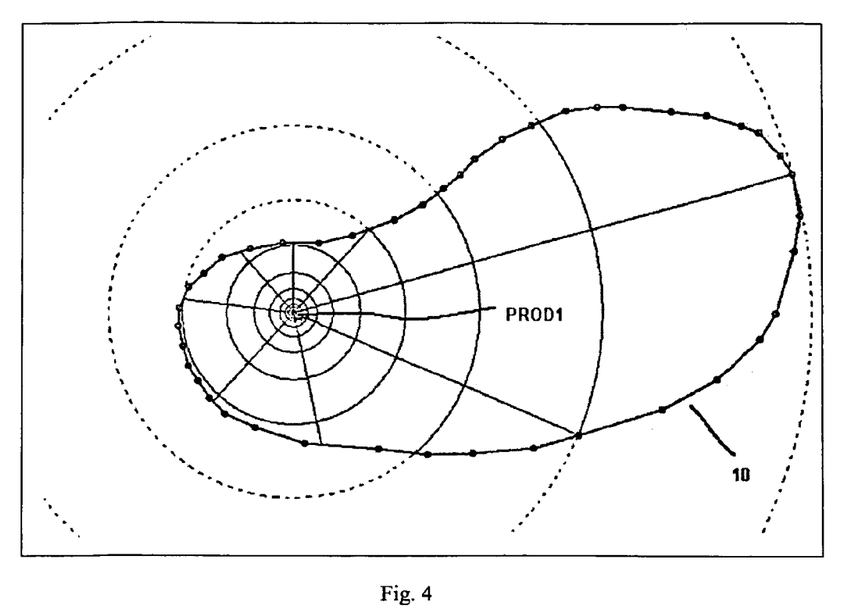
FIG. 4 shows a different grid generated for the reservoir shown in FIG. 2 by placing twenty circles around the wellbore.

The grid shown in FIG. 3 was generated by the gridding parameters shown in Table 1. The grid shown in FIG. 4 is generated by the gridding parameters shown in Table 2.

TABLE 1

Gridding Parameters for FIG. 3

| Circle number | 31 |
| Minimum angle | 0 |
| Maximum angle | 60 |
| Re factor | 1.0 |
| Layer number | 1 |

TABLE 2

Gridding Parameters for FIG. 4

| Circle number | 20 |
| Minimum angle | 30 |
| Maximum angle | 60 |
| Re factor | 1.0 |
| Layer Number | 1 |

Simulation Grid for Multiple Well Reservoirs

FIGS. 3 and 4 show an embodiment of this invention for single well reservoir gridding to illustrate the method for (1) creating an areal boundary, (2) placing a well within that boundary, and (3) and establishing circles and radii to define areal grid elements. An interactive computer program established according to the rules presented above creates a single well areal grid (with user input) as illustrated in FIGS. 3 and 4. An areal grid for multiple wells is established by the computer program with additional rules.

Figure 6:
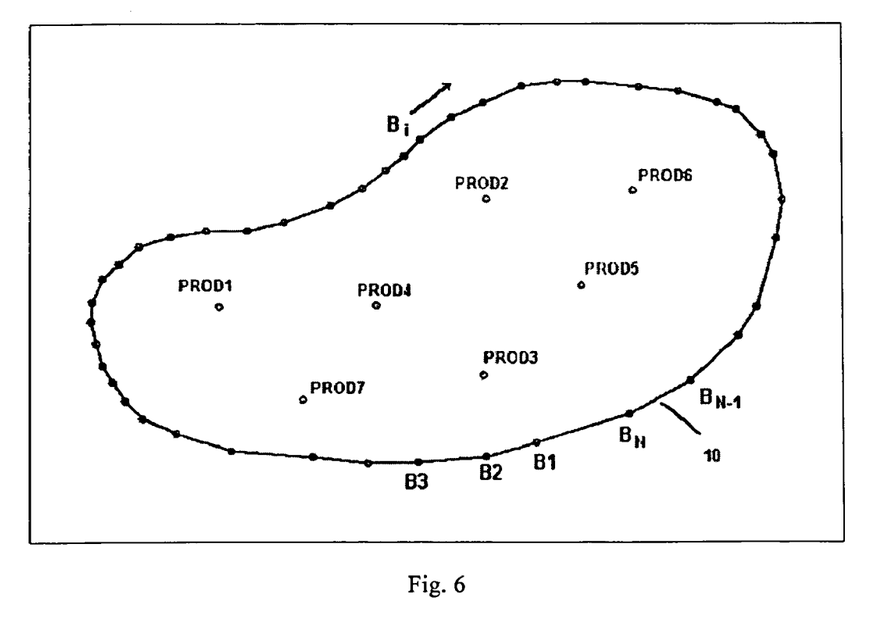
FIG. 6 shows a reservoir and the locations of seven wells within it.

For multiple well reservoir modeling, intersections of circles around one well with circles around another well are considered in addition to the intersections of circles with the reservoir boundary. A multiple well areal grid is constructed by these steps:

1) Estimate a preliminary Re value:
   a. For i-th point $B_i$ among all the boundary points, B1, B2, ... $B_{N-1}$, and $B_N$, as shown in FIG. 6: (1) calculate its distances to all the wells within the reservoir boundary respectively, and find the minimum value among these distances, $DB_{imin}$; (2) repeat step (1) for each boundary point; (3) determine the minimum value $DB_{min}$ among all the $DB_{imin}$.
   b. For the j-th well among all the wells within the reservoir boundary as shown in FIG. 6: (1) calculate its distances to all other wells and find the minimum value among these distances, $DW_{jmin}$; (2) repeat step (1) for each well in the reservoir, (3) find the minimum value $DW_{min}$ among all the $DW_{jmin}$.
   c. Choose Re as the larger of DBmin and DWmin.

2) Distribute an equal number of circles around each well. The largest circle may have the same radius value for all the wells. For each well, the first circle is its wellbore. The wellbore radius may be different from well to well. The radii pattern for each well can be geometrically distributed for efficient grid use. Alternatively, this radii pattern can be determined by the user.

3) Beginning with the first circle of each well, find its intersection points with the reservoir boundary and with the first circle of other wells. If there is no intersection draw the complete circle.

Figure 5A:
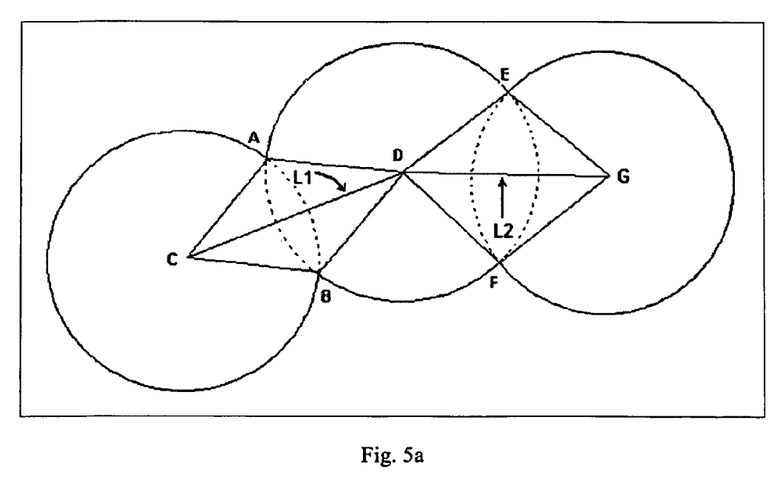
FIGS. 5a and 5b illustrate the rules for selecting arcs and radii for grid generation for multiple wells.
Figure 5B:
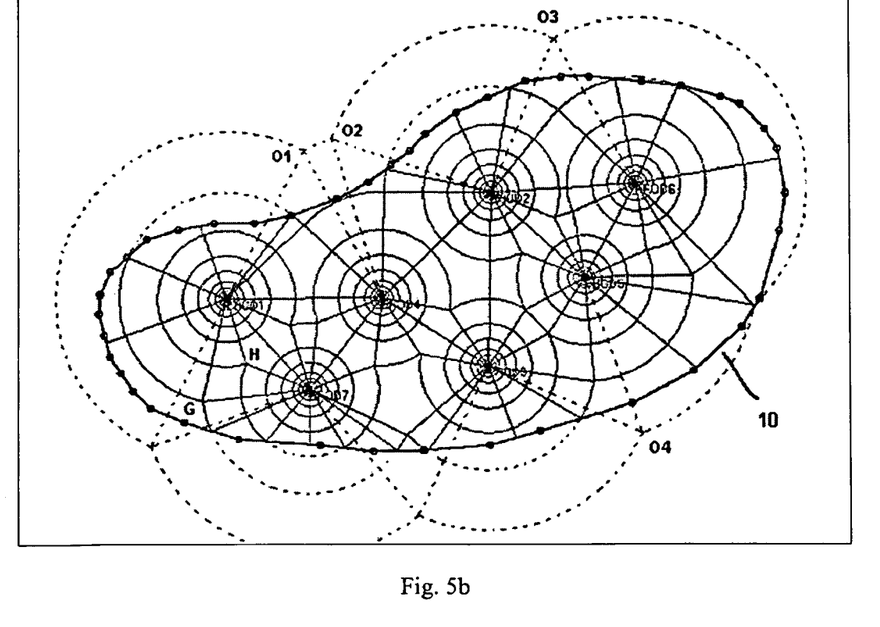

4) If the first circle does intersect the first circle around another well and the reservoir boundary, choose the arcs as grid boundaries as illustrated in FIGS. 5a and 5b. For example, refer to FIG. 5a where wells at C, D and G exist and the first intersection circles are drawn about each well. None of the circles intersect a reservoir boundary for this example. The arcs not located within other circles and not outside the reservoir boundary are drawn. Such arcs for the example of FIG. 5a are A to B (solid line counterclockwise from A to B), A to E (solid line from A to E), B to F (solid line from B to E) and E to F (solid line from E to F about the circle around well G). Those arcs are drawn about wells centered at C, D, and G. Radius lines connecting well centers to circle-to-circle intersection points are drawn, i.e. CA and CB; DA and DB; DE and DF; GE and GF.

5) If the first intersection circles of two wells intersect, (for example, see FIG. 5a where first intersection circle about well C intersects with first intersection circle about well D which also intersects with first intersection circle about well G) a line is used to connect the centers of these two wells if the following terms are meet:
   a) The link will not create an angle that is smaller than minimum allowed angle;
   b) It does not cross any radius line;
   c) It does not cut any selected arcs of a third well; and
   d) It does not cross existing well links.

For example see lines L1 and L2 illustrates the lines linking wells central at C and D and the line linking wells central at D and G.

6) Repeat steps 2) through 5) for the second circle, third circle, and so on until all the circles have been taken care of.

Figure 7:
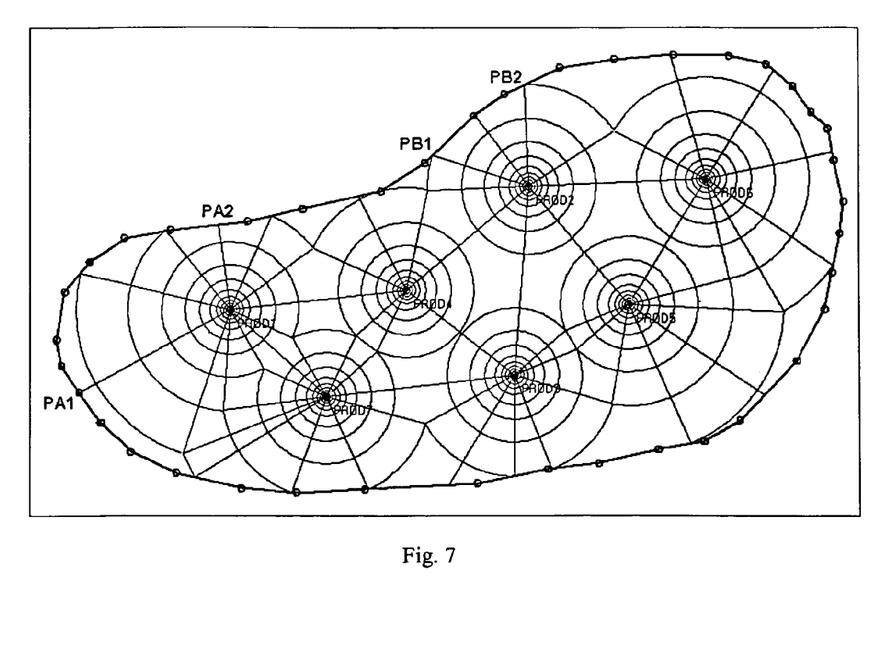
FIG. 7 shows a grid generated for the reservoir shown in FIG. 6 by placing twenty circles around each wellbore.

As an example, FIGS. 6 and 7 respectively show the schematic of a reservoir with seven wells PROD1–PROD7 and the grid constructed for the reservoir system. The gridding parameters are given in Table 3.

TABLE 3

Figure 8:
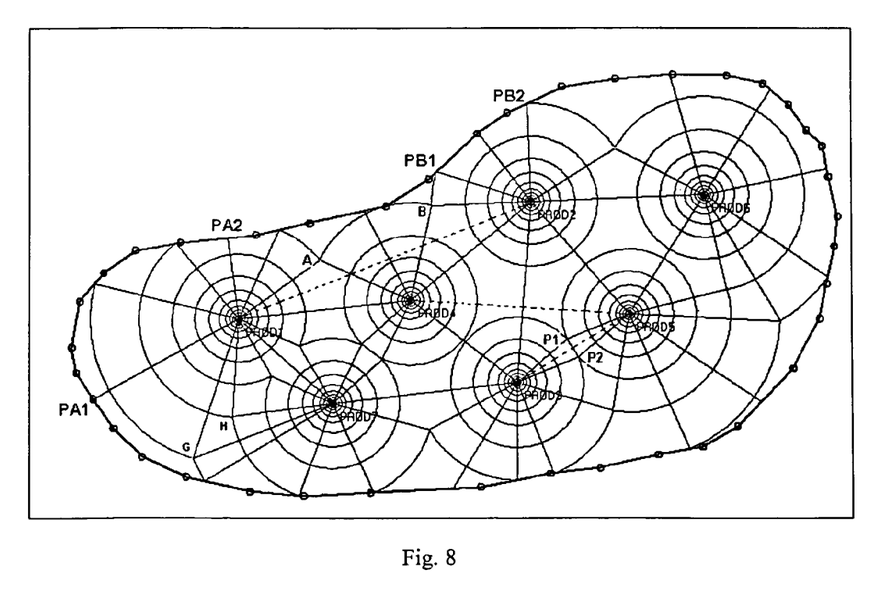
FIG. 8 illustrates the rules for selecting lines which link one well center to another well center.

Gridding Parameters for FIGS. 7 and 8

| Circle number | 20 |
| Minimum angle | 15 |
| Maximum angle | 60 |
| Re factor | 1.3 |
| Layer number | 1 |

The rules outlined in step S) are further illustrated in FIG. 8. For example, the line connecting wells PROD4 and PROD5 (well locations can be better seen in FIG. 6) is removed because it crosses another link (i.e., the link from PROD2 to PROD3. The line connecting wells PROD1 and PROD2 is removed because it crosses selected arcs and radii about a third well, PROD4. The line connecting well PROD3 and PROD5 is removed because it creates too small angle. Under this situation, the arc end points P1 and P2 are bridged to form a cell boundary.

The areal gridding process follows additional rules listed below:

1) Circle-to-circle intersection points have higher priority than circle-boundary intersection points in forming the grid.
2) A radius connecting well centers to circle-to-circle intersecting point can not allowed to be removed.
3) If an angle is formed by well link and radius which link well center to circle-circle intersection point, e.g. angle ACD in FIG. 5a, it is not subjected to the maximum angle rules.
4) If an angle is formed by a well center and two circle-circle intersection points, e.g. angle G_PROD1_H in FIG. 8, it is not subjected to the maximum angle rules.

It can be seen from FIGS. 3, 4, 5a, 5b, 7 and 8 that all the Radial-X Grid cells are formed by arcs, radii, bridge line of arc end points (line P1-P2 in FIG. 8), well links and the reservoir boundary.

The terms arc and circles have been used above. For purposes of definition in this specification, the term circle is intended to include not only a true geometrical circle but also a polygon that simulates a circle. For example, if a true circle is divided into a number of segments, for example eight as in FIG. 4, then each circle about a well point (e.g., PROD 1) may be simulated by a polygon of eight straight line sides. In other words, the arcs that are part of a circle from two adjacent radii may be substituted with straight line segments.

In other applications, concentric ellipses can be substituted for concentric circles. An elliptical grid about a well point is more suitable for a hydraulically fractured well or where the reservoir horizontal permeability is non-isotopic. For that reason the term circle as used in this description of the invention includes true geometric circles, polygons that simulate circles, and ellipses.

Vertical Gridding

Figure 9:
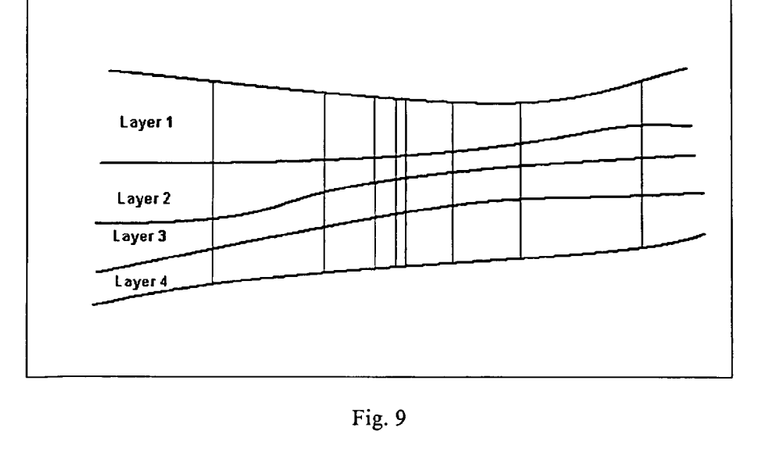
FIG. 9 illustrates gridding in vertical direction.

A reservoir usually is divided into one or more layers by geologists and geophysicists, and each of these layers may be further divided into sub-layers by reservoir simulation engineers. During vertical gridding, the areal cell boundary is vertically cast down as shown in FIG. 9. The surface of those layers sets the vertical boundary of grid cells.

Fault Treatment

Figure 10:
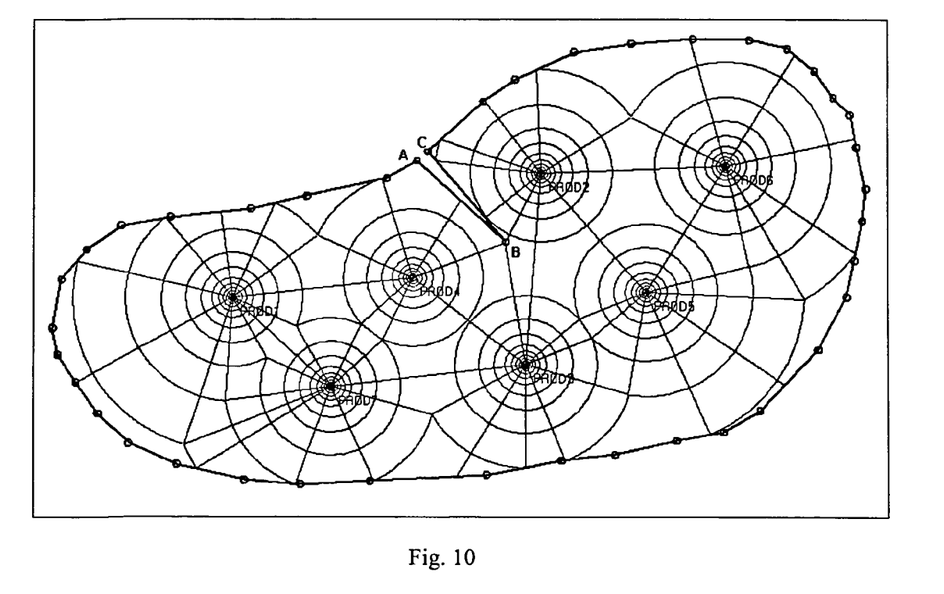
FIG. 10 shows a grid generated for a reservoir with a single fault and multiple wells.

For Radial-X Grid, the handling of faults is similar to reservoir boundary. The intersections of faults and circles and the fault end point are used in the generation of the numerical grid. In addition, a user may interactively add a radial line from well center to reservoir fault line in order to better define the fault in the grid system, e.g., lines from wells PROD2, PROD3, and PROD4 to point B as shown in FIG. 10. FIG. 10 shows the grid generated with the presence of Fault ABC.

Grid Cell Numbering

Figure 11:
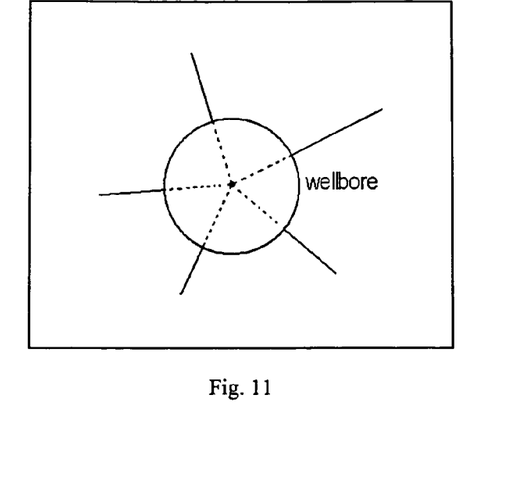
FIG. 11 illustrates a wellbore grid cell.
Figure 12:
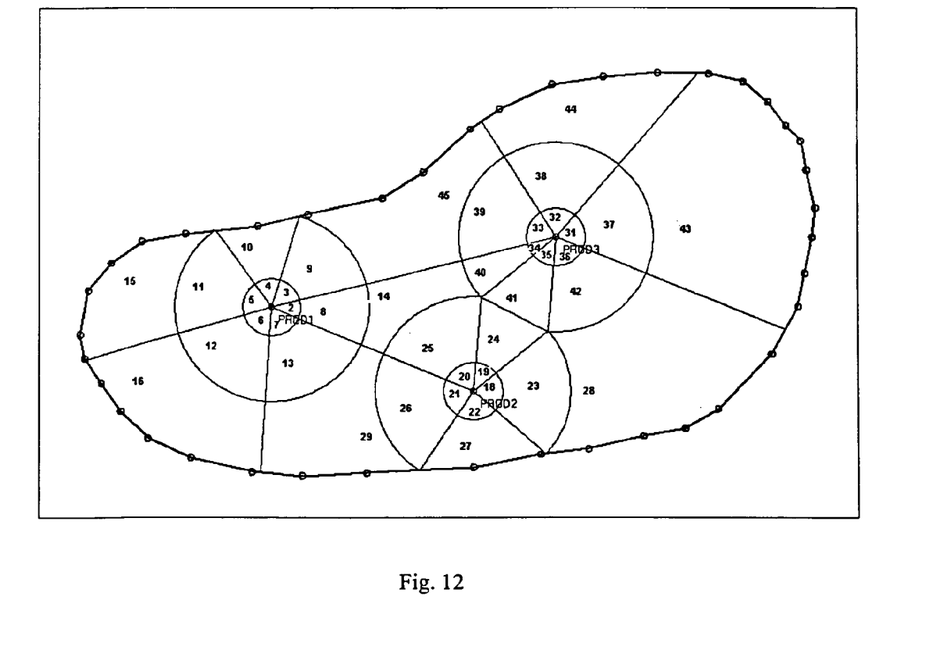
FIG. 12 illustrates a rule for grid cell numbering.

For reservoir simulation calculations, each grid cell is identified by a number. Cells are numbered on a well by well basis. The wellbore cell (illustrated in FIG. 11, which is the whole area enclosed by the first circle) is first numbered, i.e., #1 for PROD1. No cell receives the same number. If the pore volume of a boundary cell is smaller than a threshold value, it will not be numbered and therefore not involved in the simulation calculation. FIG. 12 shows the numbering of grid cells for a three well reservoir which has one vertical layer. If there is more than one layer, the cells are first numbered in the vertical direction.

Grid Cell Volume and Transmissibility

The volume of each cell is calculated. The volume of a boundary cell is the volume enclosed by reservoir boundary and related arcs and radii. The transmissibility between neighboring cells is calculated based on their contact area and the distance between cell geometry centers. Orthogonal grid cells are preferred for simulation because of the accuracy in describing flow across orthogonal cell boundaries. For the grid of this invention, called here a Radial-X Grid, the grid cells cannot be made to be orthogonal everywhere but the grid is orthogonal around the wellbores where the reservoir pressure and fluid saturations change most rapidly and need special care.

Flow Chart for Reservoir Gridding

Figure 13A:
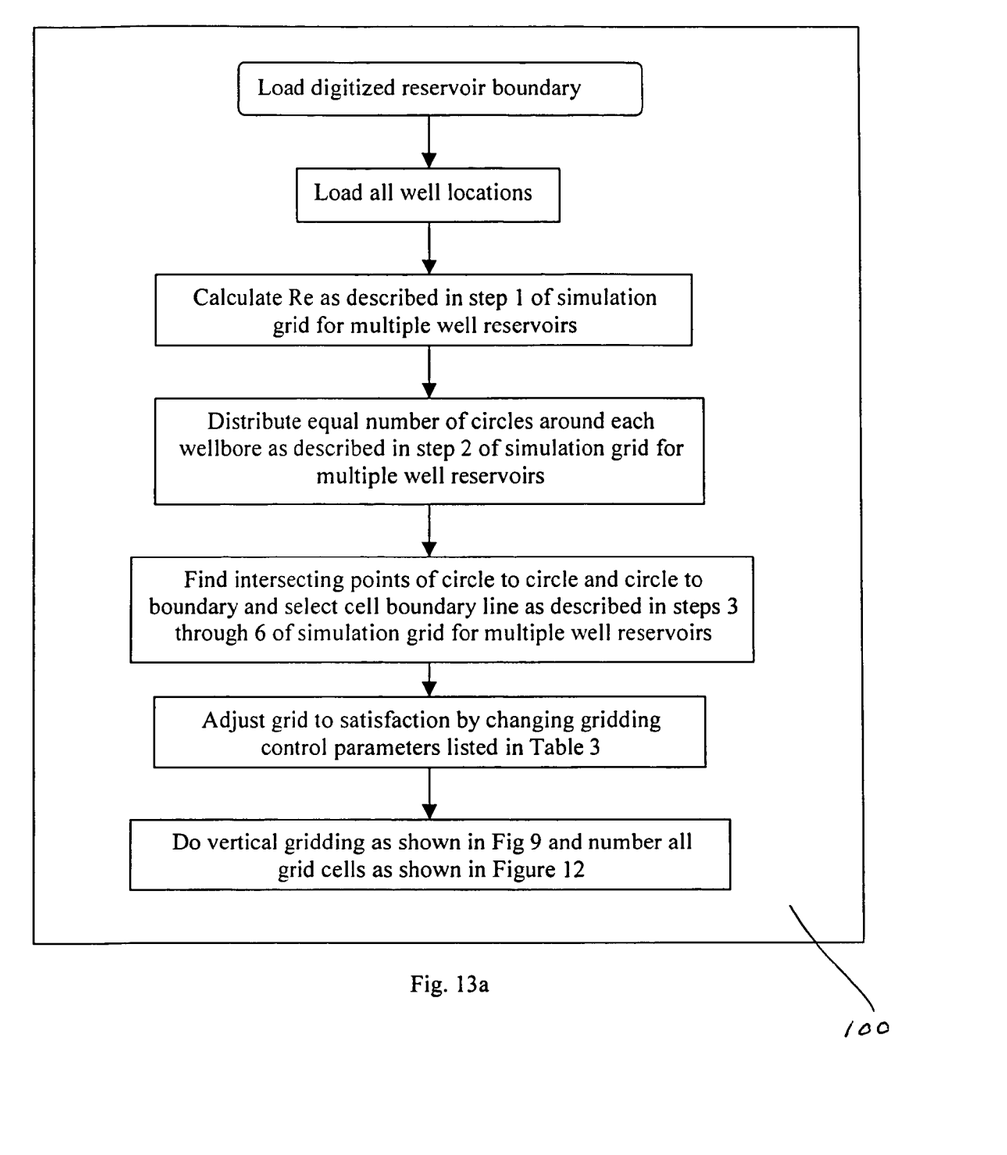
FIG. 13a is a flow chart which summarizes the procedure involved for reservoir gridding.
Figure 13B:
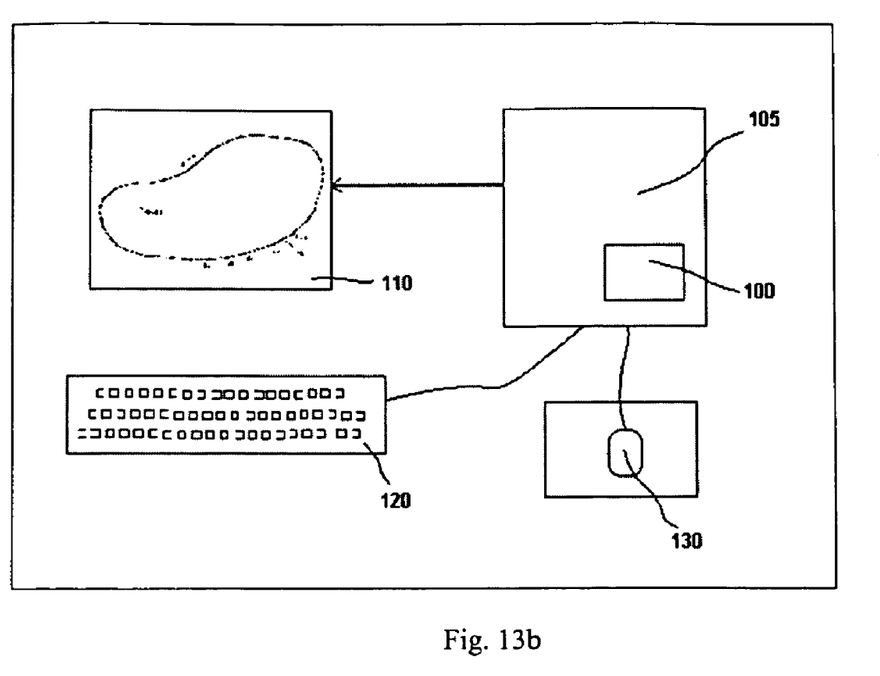
FIG. 13b is a schematic illustration of a computer loaded with gridding software constructed according to the methods disclosed in this description, which allows interactive creation of an aerial grid with inputs from a user.

FIG. 13a is a flow chart representing software 100 for reservoir gridding which summarizes the procedures outlined above for reservoir gridding. FIG. 13b illustrates a computer 105 having stored in memory software 100 as illustrated in FIG. 13a. The computer 105 has input/output drivers such as a CRT 110, keyboard 120, and mouse 130. A user can use the software and automatically establish a grid according to the method described above.

Advantages of the Gridding Methods

Gridding methods presented above are incorporated in the reservoir simulation work flow software such that automatic gridding is accomplished by a programmed computer with operator specified parameters. By using the method and, the software 100 that incorporates the method, simulation engineers can concentrate on the reservoir recovery process, instead of spending time on grid generation and moving their wells from gird cells to grid cells.

Engineers can start the simulation by specifying the recovery optimization scheme, including reservoir geometry and well locations. The automatically constructed grid is radial in nature and has such advantages as local grid refinement, no grid orientation effect and flexibility. Boundary and fault conformance problems of prior gridding systems are obviated with this method and apparatus of the invention.

What is claimed is:

1. A method for establishing a grid for simulating a geologic reservoir structure comprising the steps of:

establishing an outer boundary for an area of said geologic reservoir structure, defining a well point within said area of said outer boundary, said point corresponding to a wellbore into said geologic structure, distributing a plurality of concentric circles centered at said well point and coplanar with said area, determining the location of intersection points of said circles with said outer boundary, establishing radial lines from said well point to a plurality of said intersection points, wherein said area within said outer boundary is divided into a grid of cells.

2. The method of claim 1 further comprising the steps of, establishing a trial radial line from said well point to each of said intersection points, determining an angle between each pair of adjacent trial radial lines, establishing a final radial line by, eliminating one trial radial line of each pair where said angle is smaller than a predetermined minimum angle, and adding a new trial radial line between each point where said angle is greater than a predetermined maximum angle.

3. The method of claim 1 wherein the radius of the first circle is set equal to a wellbore radius about said point corresponding to a wellbore.

4. The method of claim 1 further comprising the steps of, defining layers below said areal grid where such layers correspond to formation layers in said geologic structure, and extending grid points from said grid vertically downwardly through said layers thereby defining grid blocks for reservoir simulation.

5. The method of claim 1 wherein said circles are geometric circles.

6. The method of claim 1 wherein said circles are simulated by polygons which are closed planar figures centered at a well point bounded by three or more line segments.

7. The method of claim 1 wherein said circles are simulated by ellipses centered at a well point.

8. A method for establishing a grid for simulating a geologic reservoir structure comprising the steps of, establishing an outer boundary for an area of said geologic structure, defining a plurality of well points within said area of said outer boundary, each of said points corresponding to a wellbore into said geologic structure, distributing a set of trial concentric circles about each of said well points, a) beginning with a first well point, identify intersection circles of the set of trial concentric circles about said first well point, where an intersection circle is defined as an outer radius circle about a well point that intersects either said outer boundary or a circle of a trial circle of another set of trial concentric circles about other well points, and find the intersection points with said outer boundary and with any circle about any other well point, b) recording final concentric circles of said trial concentric circles if a trial connection circle is not identified as an intersection circle, c) determining the location of intersection points of said first intersection circle with said outer boundary, d) establishing radial lines from said well point to a plurality of said intersection points, e) determining the location of circle-to-circle intersection points of said intersection circles with one or more circles around another well point, f) recording arcs of any intersection circle that is not within another circle and not outside said outer boundary, and g) establishing additional grid radial lines from said first well to each of said circle-to-circle intersection points, h) repeating steps a) through g) for each other well point, wherein said area within said outer boundary is divided into a grid of cells.

9. The method of claim 8 wherein said step of d) establishing radial lines from said well point to a plurality of said intersection points includes the steps of establishing a trial radial line from said well point to each of said intersection points, and determining an angle between each pair of trial radial lines, establishing grid radial lines by eliminating one trial radial line of each pair where said angle is smaller than a predetermined minimum angle, and adding a new trial radial line between each pair where said angle is greater than a predetermined maximum angle.

10. The method of claim 8 further comprising the step of, establishing a well line between the center of a well point to the center of another well point only if 1) the well line does not create an angle smaller than a predetermined minimum angle with an adjacent one of said established grid radial lines 2) said well line would not cross an established grid radial line, 3) said well line would not cut any selected arcs of a third well, 4) said well line would not cross any existing well line, and 5) repeating steps 1) through 4) until all well points have been tested.

11. The method of claim 8 wherein, the radius of the first circle about each well point is set equal to a wellbore radius corresponding to a wellbore at each well point.

12. The method of claim 8 wherein, said trial concentric circles about each of said well points are characterized by increasing circle numbers away from said well points and are characterized by radii which increase non-linearly as a function of circle numbers away from said well point.

13. The method of claim 8 wherein said circles are geometric circles.

14. The method of claim 8 wherein said circles are simulated by polygons which are closed planar figures centered at a well point bounded by three or more line segments.

15. The method of claim 8 wherein said circles are simulated by ellipses centered at a well point.

16. The method of claim 8 further comprising the steps of establishing boundary points $B_1, B_2, \ldots B_{i-1}, B_i$ on said outer boundary.

a) for each of said boundary points,
(1) determine the boundary point distance $DB_i$ to all the well points within the outer boundary for the boundary point $B_i$,
(2) find the minimum value $DB_{i\ min}$ amount all the $DB_i$,
(3) repeat steps (1) and (2) for each other boundary point; and
(4) determine the minimum value $DB_{min}$ among all the $DB_{imin}$; and b) for the well points within said outer boundary,
(1) calculate the distance between a well point and all other well points,
(2) find the minimum value amount these distances, $DW_{jmin}$,
(3) repeat steps (1) and (2) for each well point within said outer boundary, and (4) find the minimum value $D_{min}$ among all the $DW_{j\ min}$, c) choose an Re parameter as the larger of $DB_{min}$ and $DW_{min}$, and d) set the radius of a largest circle about any of said well points to Ra, where Ra=Re·Re multiplier, where Re multiplier is a factor to adjust the largest circle size of the gird.

17. The method of claim 8 wherein said outer boundary includes fault lines.

18. The method of claim 8 further comprising defining layers below said areal grid where such layers correspond to formation layers in said geologic structure, and extending grid points from said grid vertically downwardly through said layer thereby defining grid blocks for reservoir simulation.

19. A method for establishing a field scale radial grid for simulating a geologic reservoir structure comprising the steps of, establishing a boundary for an area of said geologic structure, defining a plurality of well points within said area of said boundary, each of said points corresponding to a wellbore within said geologic structure, distributing a set of trial concentric circles about each of said well points, where said trial concentric circles are characterized by increasing circle numbers away from said well points and by radii which increase in length with circle numbers away from said well point, determining boundary intersection points of said circles around each of said well points with said boundary, determining circle intersection points of said concentric circles of each well with circles around other well points, select circles which do not have boundary intersection point or circle intersection points, selecting arcs of intersecting concentric circles as grid cell boundaries, selecting radial lines from a well point to said circle intersection points of its surrounding circles with surrounding circles of other well points as grid lines, selecting radial lines from a well point to the boundary intersection points of its surrounding circles with said boundary as grid lines, wherein said area within said boundary is divided into a grid of cells.

20. The method of claim 19 further comprising the step of, selectively connecting a pair of well points as grid lines.

21. The method of claim 19 further comprising the step of, selectively connecting a pair of circle intersection points to form a grid cell boundary.

22. The method of claim 19 wherein, radial lines may be added to a well point automatically or interactively by a user to modify said grid.

23. The method of claim 19 wherein, aerial boundaries of a single grid cell of said grid cells are selected from the group of arc segments, said radial lines, said lines between arc end points, lines between said well points and said reservoir boundary, the method further comprising the step of simulating said arc segments with lines.

24. The method of claim 19 wherein, said circles are geometric circles.

25. The method of claim 19 wherein, said circles are simulated by polygons which are closed planar figures centered at a well point bounded by three or more line segments.

26. The method of claim 19 wherein, said circles are simulated by ellipses centered at a well point.

* * * * *